J. B. McCormick.
Harvester-Rake.
Nº 73623. Patented Jan. 21, 1868.

Witnesses.
H. C. Ashkettle
Theo Tusche

Inventor:
J. B. McCormick
per Munn & Co.
Attorneys

United States Patent Office.

J. B. McCORMICK, OF ST. LOUIS, MISSOURI.

*Letters Patent No. 73,623, dated January 21, 1868.*

IMPROVEMENT IN HARVESTER-RAKES.

*The Schedule referred to in these Letters Patent and making part of the same.*

TO ALL WHOM IT MAY CONCERN:

Be it known that I, J. B. McCormick, of St. Louis, in the county of St. Louis, and State of Missouri, have invented a new and improved Reaper or Grain-Harvester; and I do hereby declare that the following is a full, clear, and exact description thereof, which will enable those skilled in the art to make and use the same, reference being had to the accompanying drawings, forming part of this specification.

This invention relates to a new and improved raking and a gavel-delivering attachment for reapers, as hereinafter fully shown and described, whereby the cut grain is raked from the platform of the machine upon a tilting-table, which is operated in such a manner as to deliver the cut grain, raked upon it, to the binders.

The invention consists in a new and improved means employed for operating the rake over an inclined curved or segment-platform, and in the use of the tilting gavel-receiving table, also operated in a peculiar manner. In the accompanying sheet of drawings—

Figure 1:
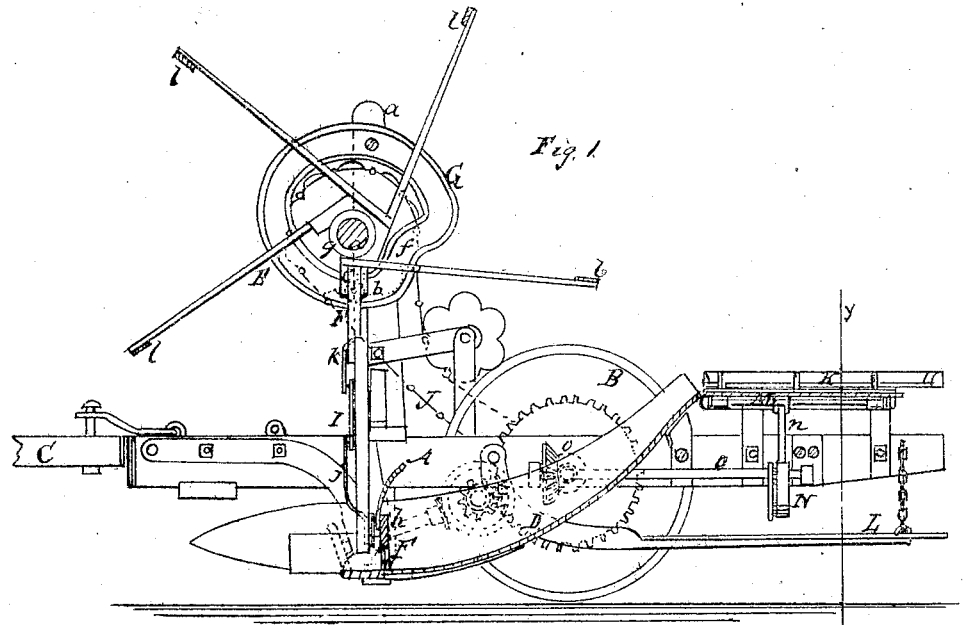
Figure 2:
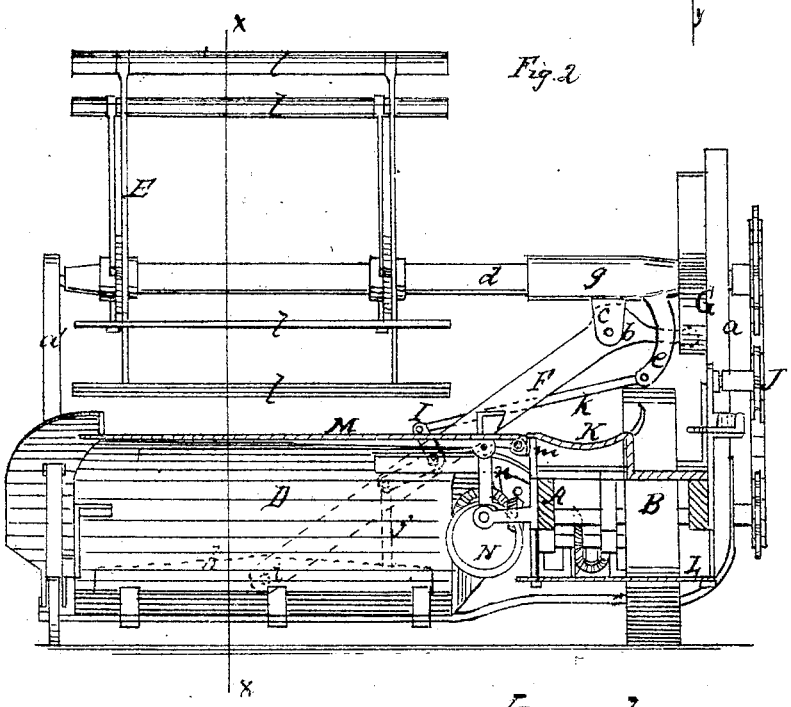

Figure 1 is a side sectional view of my invention, taken in the line $x\,x$, fig. 2.

Figure 2, a transverse vertical section of the same, taken in the line $y\,y$, fig. 1.

Similar letters of reference indicate corresponding parts.

A represents the main frame of the machine, in which the driving-wheel B is placed, and which has the draught-pole C attached. D is the platform, which is of curved or segment form in its transverse section, and has an inclined position, so that the rear end will be more elevated than the front end, as shown clearly in fig. 1. E is the reel, the supports $a\,a'$ of which are attached, one, $a$, to the main frame, and the other, $a'$, to the bar at the grain-end of the platform. The reel may be constructed in the usual or in any proper manner. F is a rake-arm, which is pivoted as shown at $b$, in a projection, $c$, on the reel-shaft $d$, the outer part of this arm, beyond the pivot $b$, passing through a segment-guide, $e$, on the reel-shaft, and the outer end of the arm having a friction-roller upon it, which works in a fixed cam, G, the latter being composed of an irregular curved groove, $f$, approximating to a heart shape, as shown clearly in fig. 1. The projection $c$ and segment-guide $e$ may be attached to a metal socket, $g$, fitted on the reel-shaft. This fixed cam, as the machine is drawn along, and the reel-shaft is rotated, causes the rake-arm F to work towards and out from the reel-shaft. H is the rake, the head $h$ of which is pivoted centrally, as shown at $i$, to the outer end (the end which works over the platform) of the arm F. The rake-head, near the end which is nearest to the fixed cam G, has one end of a rod, $j$, pivoted to it, the opposite end of said rod being pivoted to one of the arms of a bent lever, I, on the rake-arm F, the other arm of said bent lever being pivoted to one end of a rod, $k$, the opposite end of which is pivoted to the outer end of the segment-guide $e$, as shown clearly in fig. 2. The object in connecting this rake-head to the rake-arm by the rods and bent lever, as shown, is to keep the rake parallel with the reel-shaft, and with the face of the curved or segment-platform D. The rake-arm rotates with the reel of course, as it is attached to the shaft of the latter, and the reel is rotated from the driving-wheel B by means of an endless chain, J. The teeth of the rake are quite near the platform, as the former work or pass over the latter; but the bars $l$ of the reel are some distance from the platform, so as not to disturb, in their revolutions, the cut grain which they force over upon it. The fixed cam G has such a shape and position that it will throw down the rake at the front end of the platform D, and keep the rake down until it reaches the elevated rear end of the platform, and then draw in the rake to the reel-shaft, and keep it there until it passes around to the front side of the reel-shaft, when it is again forced down to the front end of the platform. At the rear end of the main frame A there is a binding-table, K, and a platform, L, underneath it, for the binders to stand upon while binding up the gavels. These parts having been previously patented by me, do not here require a special description.

To the inner side or edge of the binding-table K there is attached by hinges, $m$, a table, M, which, when down, has a horizontal position on a level with the elevated rear end of the platform D. The under side of this table, near its hinged end, is connected by a rod, $n$, to an eccentric, N, which is at the outer end of a shaft, O, the latter receiving its motion by means of bevel-gears $o$, from the axle of the driving-wheel B. The eccentric N is placed in such a position on the shaft O, with respect to the movement of the rake H, that the table M will commence to rise just as the rake rises from or above the rear end of the platform D, the table being raised to a vertical position, and descending to a horizontal position, which it reaches by the time the rake commences to sweep over the platform D. The rake carries the cut grain on the platform upward, and discharges it upon the table M, and the latter, as it rises, discharges the cut grain or gavel upon the binder's table K, the grain or gavel dropping by its own gravity upon the table K.

By this arrangement it will be seen that all the working parts are operated automatically, and none of them will be liable to get out of repair or become deranged by use.

I claim as new, and desire to secure by Letters Patent—

1. Operating the pivoted rake-head H by means of the fixed cam G, into the groove $f$ of which the outer end of the rake-arm F is fitted, in connection with the rods $j\ k$, and the bent lever I, all arranged to operate in the manner substantially as and for the purpose set forth.

2. The hinged table M, operated through the medium of the eccentric N, from the driving-wheel, substantially as set forth 3. The combination of the rake H and hinged table M, constructed and arranged for joint operation, in the manner substantially as and for the purpose specified.

J. B. McCORMICK.

Witnesses:
    D. C. HAMMOND,
    JNO. J. DEADWICK.